United States Patent [19]

Aranceta-Angoitia

[11] Patent Number: 4,900,046

[45] Date of Patent: Feb. 13, 1990

[54] TRANSMISSION FOR BICYCLES

[76] Inventor: Inaki Aranceta-Angoitia, Caserio, Anzuola, Spain

[21] Appl. No.: 254,408

[22] Filed: Oct. 6, 1988

[30] Foreign Application Priority Data

Oct. 6, 1987 [ES] Spain ................................ 8702849

[51] Int. Cl.[4] ......................... F16H 3/44; B62M 1/02
[52] U.S. Cl. .................................. 280/260; 74/750 B
[58] Field of Search .............. 280/260, 259; 74/750 B, 74/740

[56] References Cited

U.S. PATENT DOCUMENTS

| | | | |
|---|---|---|---|
| 519,557 | 5/1894 | Sheldon | 280/260 X |
| 589,266 | 8/1897 | Nedland | 280/260 |
| 598,863 | 2/1898 | Evans | 280/260 |
| 624,964 | 5/1899 | Oberhammer | 280/260 |
| 649,878 | 5/1900 | Scharbach | 280/260 |
| 2,378,634 | 6/1945 | Hussey | 280/260 |

Primary Examiner—Dirk Wright
Attorney, Agent, or Firm—Helfgott & Karas

[57] ABSTRACT

A transmission for bicycles, which substitutes the conventional chain transmission, and which comprises a rimcarrier plate connected to the pedal shaft of the bicycle. A plurality of concentric rings or rims engage with respective pinions mounted with freedom of rotation on a tubular transmission shaft. Within the transmission shaft is positioned a sliding element provided with a diametrical arm, which allows one of the pinions to be blocked at will with respect to the transmission shaft. One guiding rims-pinions group is complemented by a second similar guided rims-pinions group, at the other end of the shaft. The other group of rims and pinions may be selected by an identical arrangement in which a second guided rimcarrier plate transmits the movement through a multiplying planet assembly and ratchet pawls to the shaft of an outlet planetary pinion which is engaged with an engaging track provided on the inner side of the rim of the rear wheel.

2 Claims, 2 Drawing Sheets

TRANSMISSION FOR BICYCLES

FIELD OF THE INVENTION

The present invention relates to a transmission for bicycles, destined to substitute the conventional chain which connects the pedal shaft with the shaft of the rear wheel, which transmission is based in a wholly different idea, on the basis of two sets of gears connected by a drive shaft.

BACKGROUND OF THE INVENTION

As is known, conventional bicycles are provided with a plate which is duly stiffened to the pedal shaft, from which the movement supplied to the pedals is transmitted, through a chain, to a pinion related to the rear wheel of the bicycle, which pinion is aided by a pawl system which allows the free rotation thereof in a specific direction.

On the other hand, and in order to vary the relationship of the transmission, in some cases the pinion related to the wheel is multiple, i.e., it is comprised of several pinions with a different diameter and consequently with a different number of cogs, and in other cases the plate related to the pedal shaft is likewise double or multiple, such that depending on the plate-pinion relationship in which the chain is established, a specific transmission relationship will in turn be established.

Given that the separation between the wheel shaft and the pedal shaft is constant, which is also the case of length of the drive chain, whereas the use of different rim-pinion groups will theoretically need chains with a different length, and furthermore, in any of the cases, the chain must be overdimensioned in order to allow the changes of pinion or rim, it is necessary to use tensile means to prevent uncoupling thereof, i.e., uncoupling thereof with respect to the elements which it couples to each other.

All of this brings about the use of complex change mechanisms, which require a high degree of precision, and which nevertheless do not eliminate the notable risk, both in changes and in the normal circulation of the bicycle, in the event of a hole in the road or due to any other circumstance, of the chain being uncoupled.

SUMMARY OF THE INVENTION

The transmission of the present invention has been designed to fully solve the above-described problems, ensuring an optimum functional nature, and rendering uncouplings in the transmission impossible.

More specifically, and in order to achieve the above, the transmission of the present invention is destined to be installed on the conventional chassis of the bicycle which relates to support fork of the rear wheel of the bicycle with the rotation nucleus for the pedal shaft. The chassis is obviously affected with slight modifications required by the transmission itself, which is adapted to actuate not only the shaft of the rear wheel, as is conventional, but also the rim of said wheel, specifically by engaging track operatively provided on the inner side of the rear wheel.

Specifically, the transmission according to the invention comprises a rimcarrier plate, connected to the pedal shaft of the bicycle, to which plate are rigidly connected a plurality of concentric rims, the number of which may vary depending on the possibilities forseen as regards the transmission relationship. The rims engage with respective pinions mounted with freedom of rotation on a tubular transmission shaft, within which plays, at the end corresponding to said rimcarrier shaft, a diametrical extension or arm, rigidly connected to a gear rod housed within the shaft, which arm may be engaged in any of the previously mentioned pinions, such that of said set of pinions only the pinion related to the arm will be operating, a specific variable transmission relationship thus being obtained between the rimcarrier plate. i.e., between the pedal shaft and the transmission shaft.

The rod with which the positional change of the arm is brought about with respect to the set of pinions, on the end opposed to said arm, is provided with a radial rod which crosses the tubular shaft and which is rigidly connected to a ring provided with an external perimetral neck, wherein in turn plays a further rod activated by means of a control knob, through which axial displacements of the rod are obtained, and consequently, of the arm, in order to change the operating pintion-rim group.

This same structure is provided at the other end of the transmission shaft, where there is also a set of guided pinions, which selectively receive the movement of the transmission shaft through a further arm activated by the corresponding rod and the corresponding control knob, said pinions engaging respective guided rims mounted on a support plate the shaft of which is rigidly connected to the previously mentioned chassis. That plate, through a freewheel pawl and a multiplying plant element, transmits the movement to an outlet pinion which engages the track with which the wheel is provided on the inner side of the rim thereof.

Obviously, and in accordance with the structure described, by adequately handling the two control knobs, the gujiding pinion-rim groups and the guided pinion-rim groups which are operating in the transmission may be selected, and, consequently, the multiplying effect of the transmission may be regulated at will, within a broad scope of values, which may obviously vary depending on the number of pinions and rims used therein.

DESCRIPTION OF THE PREFERRED EMBODIMENT OF THE INVENTION

Figure 1:
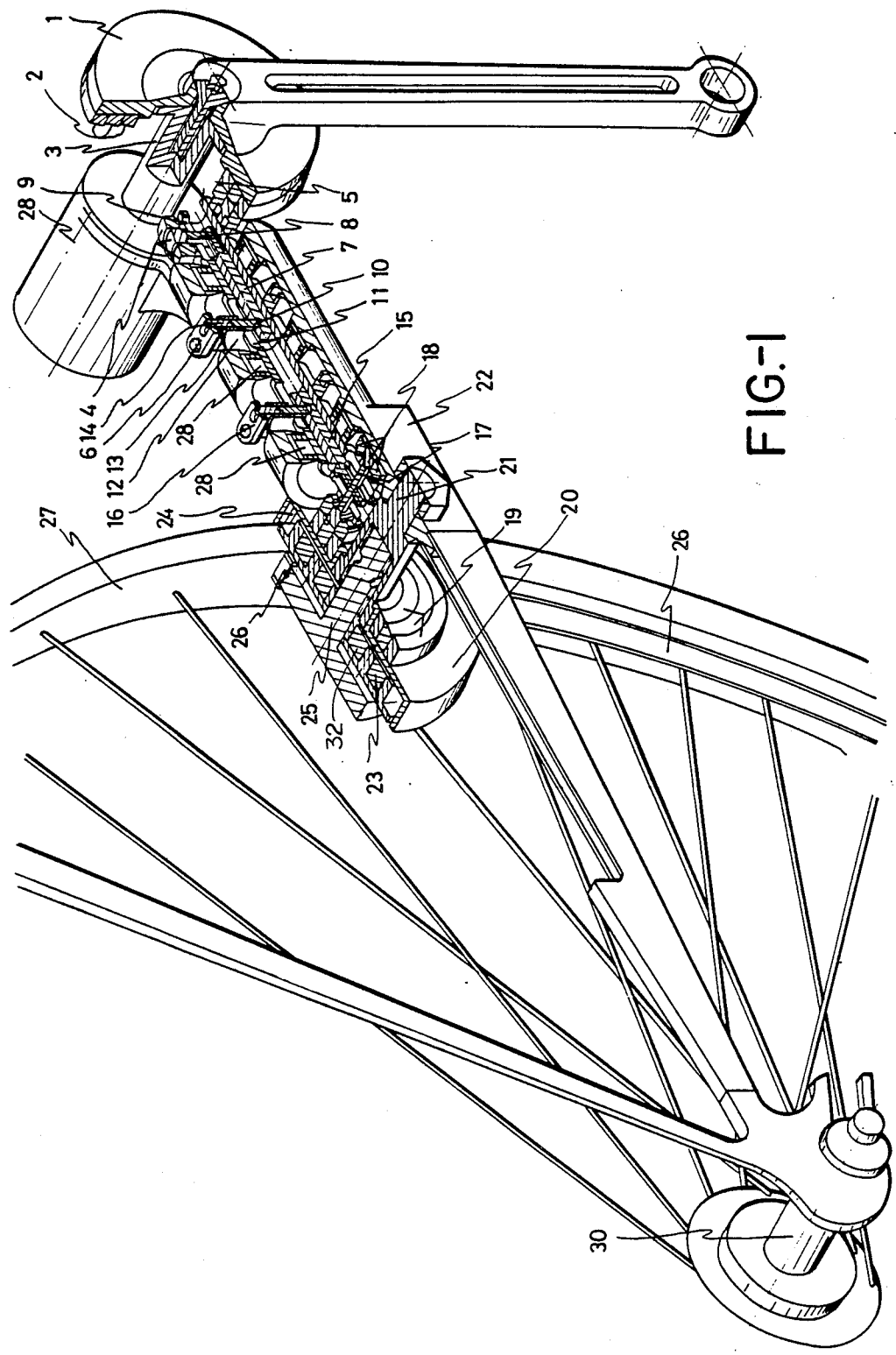
FIG. 1 is a partial perspective view, partially in section, of a bicycle fitted with the transmission in accordance with the present invention.

Referring now to the drawings in detail, it may be observed that the transmission of the present invention is constituted by a plate 1, which carries a plurality of guiding rims 2, which in the example of a practical embodiment shown in the drawings are three, but which number may vary without this affecting the essence of the invention, which plate 1 is stiffened to pedal shaft 3 of the bicycle.

The guiding rims 2 are rigidly connected to the plate 1 and permanently engage respective guiding pinions 4 mounted with freedom of rotation on a tubular shaft 5, such that only one of the pinions 4 and the corresponding guiding rim 2 will be operating at a time, the elements which must be operating being selected by means of a control knob 6.

More specifically, the hollow inside of transmission shaft 5, is provided with an axially displaceable rod 7, and in the end whereof corresponding to the pedal axis incorporates a diametrical extension or arm 8 which projects externally from shaft 5 through wide and longitudinal apertures 9 which allow such longitudinal displacement of the arm, in order that the latter be embedded in any of the pinions 4, specifically with the one which is desired to be operating at each time.

On its part, the other end of rod 7 is radially rigidly connected to a rod 10 which likewise crosses hollow shaft 5 through a further wide aperture 11 and which is fixed to a ring 12 which accompanies the shaft 5 on rotation thereof. Ring 12 is provided with an external perimetral neck 13 wherein plays a further rod 14 on which acts control knob 6 which adopts a fork-like configuration therefor, as shown in the drawings.

Thus, and in accordance with the foregoing, by tilting knob 6, acting on the corresponding control, wherein will be established the same number of positions as guiding pinions 4 are provided in the transmission, arm 8 is embedded in a specific pinion 4 and, consequently, a specific transmission relationship is likewise established between pedal shaft 3 and transmission shaft 5.

In the opposite area of structure transmission shaft 5, a structure is repeated which coincides with that previously described, specifically on the basis of a second rod 15, which may be displaced longitudinally within hollow shaft 5, when it is activated by a corresponding second knob 16 and with the same transmission means, the other end of which rod 15 comprising a further arm 17 through which the tubular shaft is connected to one of pinions 18 which make up the second group of guided pinions which are permanently engaged to a corresponding set of guided rims 19 rigidly connected to a rimcarrier plate 20 mounted with freedom of rotation on a shaft 21 duly connected to chassis 22 of the assembly. The rimcarrier plate 20, through a multiplying planet gear element assembly 23 which will be described in connection with FIG. 2 and freewheel pawls 24, transmits the movement to the shaft of an outlet pinion 25, which shaft is mounted within the hollow inside shaft 21 of the rimcarrier plate 20 and duly fixed in its housing, in an axial direction, this outlet pinion 25 engaging a coupling track 26 established on the inner side of rim 27 of the wheel, such that, through this second transmission sector corresponding to the wheel, a new transmission regulation or selection may be effected by acting on knob 16, in an analogous manner to that which has already been described for control knob 6.

Chassis 22 to which shaft 21 of the plate is rigidly connected, receives therewithin transmission shaft 5 through needle bearings, this chassis 22 substituting one of the arms of the fork which conventionally connects a nucleus 28 which houses pedal shaft 3 with a shaft 30 of the rear wheel and which takes part in the stiff structure of the bicycle.

Figure 2:
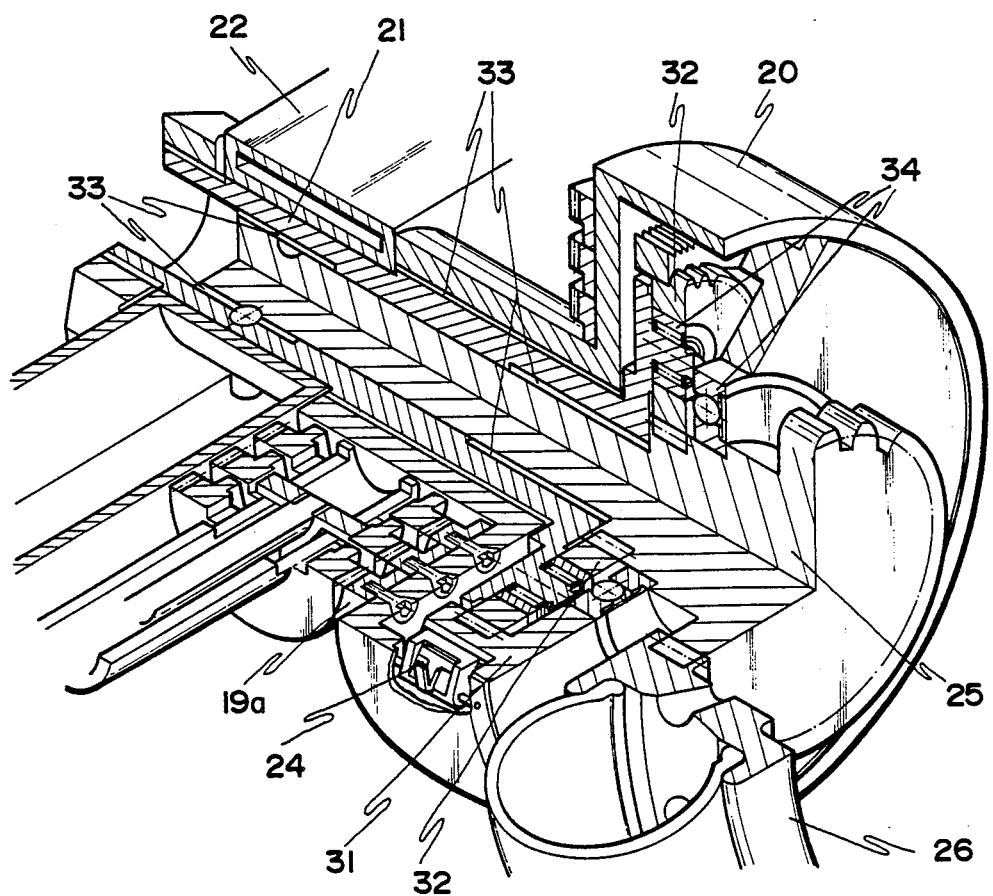
FIG. 2 is a sectional perspective view of a coupling wheel sector with a planet gear assembly of the transmission of FIG. 1, on enlarged scale.

With reference to FIG. 2 there is shown the planet gear assembly 23 in greater detail. The multipler planet gear assembly may be of any suitable conventional type capable of fulfilling the muliplier function. In a preferred embodiment of the invention, it is shown as a hepicycloidal multiplier, which fulfills the function of increasing the transmission ratio between an input shaft and an output shaft. The planet gear assembly 23 includes the rim carrier plate 20 which forms the above-mentioned external crown 20 which acts as an imput shaft, to which are screwed the crown wheels of a secondary gear 19a. The crown having pawls or ratchets 24 which transmit power in a rotation direction, slipping on in the other direction of rotation due to a conventional spring which supports it and the shape of cogs or satellites 32 of a drive gear 31 which transmit the stress. The gear 31 has an inner gearing which intermeshes with a number of cogs or satellites 32, fitted on shaft 21 which forms a common support therefor and is firmly secured to chassis 22, so they turn loose on the shaft, and, in turn gear up with the outlet pinion 25 which forms another plante gear and which is the one that finally intermeshes with the wheel track 26. All these components rotate in bearings 33 and 34.

I claim:

1. Transmission for a bicycle having a nucleus assembly supporting a pedal shaft and a chassis connecting said pedal shaft to a rear wheel of the bicycle, the transmission comprising a first rimcarrier plate rigidly connected to the pedal shaft of the bicycle, a first set of concentric guiding rims fixed to said rimcarrier plate, a drive shaft positioned in said chassis, a first set of pinions permanently engaging said rims and mounted with freedom of rotation on said drive shaft which is radially extended from the pedal shaft to the rear wheel of the bicycle, said drive shaft being a hollow transmission shaft, first means positioned in said hollow transmission shaft for selectively connecting each one of said pinions to said transmission shaft, second selecting means provided on the other end of said transmission shaft, a second rimcarrier plate mounted with freedom of rotation on an additional shaft rigidly connected to the chassis and extending perpendicular to said transmission shaft, a second set of guiding rims rigidly connected to said second rimcarrier plate, a second set of pinions permanently engaging said respective rims of said second set, a multiplying planet assembly including said second rimcarrier plate and pawls provided thereon, said additional shaft having thereon an outlet pinion which plays on an engaging tack of said rear wheel, and said second selecting means selectively connecting one of said pinions of said second set to said transmission shaft and via said second rimcarrier plate, said multiplying planet assembly and said pawls transmitting a movement of said transmission shaft to said additional shaft and thereby to said outlet pinion, said chassis serving as one of the two arms of a fork connecting the rear wheel to said nucleus.

2. Transmission for a bicycle in accordance with claim 1, wherein each of said first and second selecting means comprises a control knob, a transmission rod longitudinally displaceable within the hollow transmission shaft by said control knob, and a radially extended arm rigidly connected to said rod and projecting externally from said transmission shaft through wide apertures of said transmission shaft and which may adopt a plurality of uncoupling and coupling positions for each of the pinions of the respective set, each of said control knobs being tiltable to effect a longitudinal displacement of the respective transmission rod and consequently cause a change in position of the respective arm to be engaged in a selected one of the pinions of the respective set to select one of multiple pre-established positions corresponding to the number of pinions of the corresponding set.

* * * * *